Patented Mar. 30, 1937

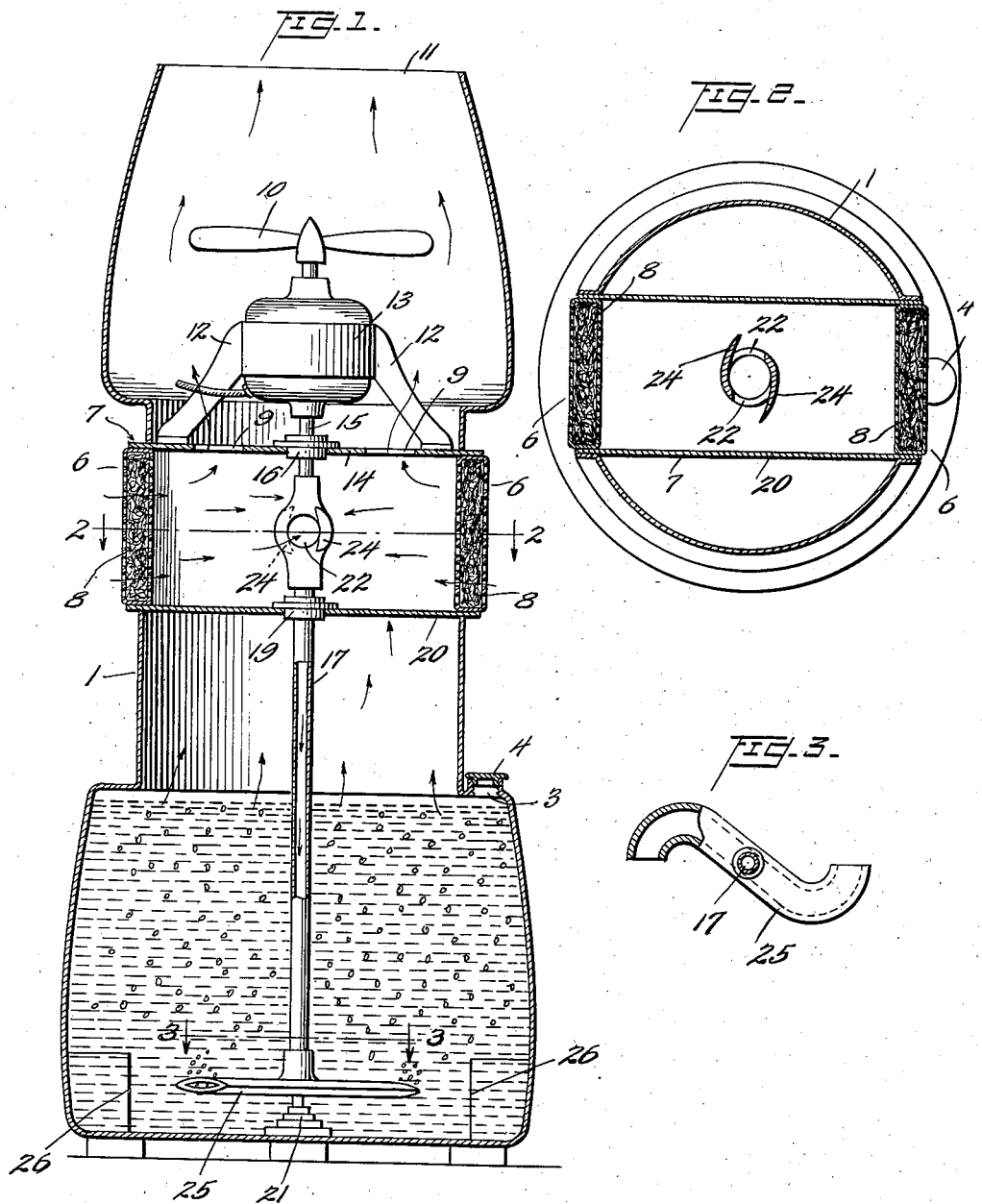

2,075,384

UNITED STATES PATENT OFFICE 2,075,384

PORTABLE AIR CONDITIONER FOR ROOMS

Carl G. Vretman, Atlanta, Ga., assignor of one-tenth to Robert H. Fulton, Atlanta, Ga., and one-tenth to W. Kenneth Watkins, New York, N. Y.

Application June 4, 1936, Serial No. 83,580

7 Claims. (Cl. 183—17)

This invention relates to portable air conditioners for rooms and has for an object to provide a simple and inexpensive device for humidifying and cleaning the air in a room.

A further object of this invention is to provide a device for humidifying the air in a room without plumbing connections whereby the cost of construction and installation is minimized.

Another object of this invention is to provide an efficient humidifier of simple form in which the air in extremely small bubbles is passed through a body of water and washed and humidified.

Another object of this invention is to provide a simple and convenient apparatus operated by a single electric motor for filtering, washing, humidifying, and circulating the air in a room.

Further objects and advantages of the invention will be apparent from the following detailed description and the accompanying drawing.

In the drawing:

Fig. 1 is a vertical sectional view of an embodiment of this invention;

Fig. 2 is a horizontal sectional view on the line II—II of Fig. 1; and

Fig. 3 is a plan view of a detail on line III—III of Fig. 1.

The portable air conditioner comprises a casing designated generally by numeral 1, the lower part of the casing constituting a vessel 2 adapted to be filled with water through an opening 3 having a removable screw cap 4.

Above the water vessel section, the walls of the casing are provided with one or more openings, shown in the drawing as a pair of oppositely disposed openings 6. Between these openings extends an open-ended box-like chamber 7, the open ends of which are covered or filled by removable filters 8 of any suitable filtering material adapted to remove foreign matter, such as dust and pollen, from the air passing therethrough. The filters may be made of such materials as glass wool, metal wool, mineral wool, or other materials adapted to accomplish the desired purpose. The upper wall of the filtered air box or chamber 7 is provided with one or more filtered air outlet openings 9.

In the upper part of the casing a fan 10 is mounted in position to blow a current of air upwardly through an opening 11 in the top of the casing. The fan is driven by an electric motor 13 which is supported by brackets 12 having their lower ends attached to the top wall 14 of the filtered air box 7. This motor also drives a shaft 15 journalled in a bearing 16 in the central part of the upper wall of air box 7. If desired this bearing may be a thrust bearing for supporting the shaft. The lower end of this shaft is coupled to the upper end of a vertically extending hollow shaft or pipe 17 mounted rotatably in a bearing 19 which may be supported by the bottom wall of air box 7. If the connection between shaft 15 and pipe 17 is sufficiently rigid to prevent wabble the bearing 19 may be omitted, in which case pipe 17 simply passes through an opening in the bottom wall of the air box.

The lower end of pipe 17 is rotatably supported by a bearing 21 at the central part of the bottom wall of the water vessel portion 2 of the casing 1. In case the bearing 16 is constructed as a thrust bearing, the bearing 21 may be an ordinary bearing for merely guiding the lower end of pipe 17, but bearing 21 may also be a thrust bearing, especially if bearing 16 is an ordinary bearing. At the upper portion of the pipe 17 at a point within filtered air box 7, between the filters 8 the pipe is provided with one or more openings 22 through which filtered air may enter the pipe. In order to facilitate the entry of air into pipe 17 through these openings curved air scoops 24 may be provided adjacent the openings. At the lower end of pipe 17 a dasher member 25 is mounted on the pipe to rotate therewith. The dasher comprises a pair of hollow, oppositely extending arms having their outer ends curved rearwardly with respect to the direction of rotation. At the bottom edge of the water vessel 2, a plurality of stationary blades 26 extend inwardly for the purpose of reducing the motion of the water which has a tendency to rotate under the influence of rotating dasher 25.

Before starting the device in operation the water vessel 2 should be filled with water substantially to the level of inlet opening 3 and the cap 4 screwed tightly closed. The motor 13 is then connected with a suitable source of electric power, whereby the fan 10, pipe 17 and dasher 25 are caused to rapidly rotate. The fan produces an upward current of air and draws air into the air box and casing through filters 8. Part of the air entering through the filters passes into the openings 22, down through pipe 17, and outwardly through dashers 25 from whence it is distributed into the water in extremely small bodies or bubbles. These small bubbles rising through the water absorb the water to substantial saturation. Upon reaching the water surface this moist air passes upwardly through passages at the sides of air box 7 and mixes with the current of air passing upwardly through the openings 9 under the influence of fan 10, whereby the moisture content of the air passing out of the casing is higher than when drawn in through the filters 8.

The air which passes down through pipe 17 seems to be acted on by three forces; firstly, the pressure produced by the rotating air scoops 24; secondly, the centrifugal force of the air in the hollow dashers 25; and, thirdly, the impeller action of the rearwardly directed end portions of the dashers passing through the relatively stationary water. This last force particularly has the effect of drawing the air from the ends of the dashers in finely attenuated condition, producing very small bubbles and thereby providing a maximum contact area between the air and water.

What I claim is:

1. A portable air conditioner comprising a casing, the lower portion of said casing comprising a vessel for containing water, said casing having an opening for filling said vessel, a fan in the upper portion of the casing for producing an upward current of air, a filter in a wall of said casing between said water vessel and said fan, whereby said fan draws air into the casing through said filter, and forces said air outwardly from the upper portion of said casing, and rotating means for conducting part of the filtered air downwardly beneath the surface of the water and releasing it there in the form of small bodies to return to the water surface and mix with the current of air passing outwardly from the upper end of the casing.

2. In an air cleaner and humidifier, a portable casing, having an air inlet opening in a side wall and an air outlet opening in its upper portion, a filter covering the inlet opening, a fan in said casing above said inlet opening, an electric motor for driving said fan, the lower portion of said casing below said filter comprising a water-containing vessel, a hollow rotary shaft connected with said motor to be rotated thereby, said shaft having an inlet opening adjacent said filter, the lower portion of said shaft beneath the water surface having a hollow radially directed arm in communication with the hollow of said shaft, and having an air outlet opening at a point radially spaced from said shaft.

3. In an air cleaner and humidifier, a portable casing, having an air inlet opening in a side wall and an air outlet opening in its upper portion, a filter covering the inlet opening, a fan in said casing above said inlet opening, an electric motor for driving said fan, the lower portion of said casing below said filter comprising a water-containing vessel, a hollow rotary shaft connected with said motor to be rotated thereby, said shaft having an inlet opening adjacent said filter, the lower portion of said shaft beneath the water surface having a hollow radially directed arm in communication with the hollow of said shaft, and having an air outlet opening at a point radially spaced from said shaft, the outer end portion of said hollow arm being rearwardly curved relative to the direction of turning.

4. In an air cleaner and humidifier, a portable casing, having an air inlet opening in a side wall and an air outlet opening in its upper portion, a filter covering the inlet opening, a fan in said casing above said inlet opening, an electric motor for driving said fan, the lower portion of said casing below said filter comprising a water-containing vessel, a hollow rotary shaft connected with said motor to be rotated thereby, said shaft having an inlet opening adjacent said filter, the lower portion of said shaft beneath the water surface having a hollow radially directed arm in communication with the hollow of said shaft, and having an air outlet opening at a point radially spaced from said shaft, the air outlet opening of said arm being rearwardly directed relative to the direction of turning.

5. In an air cleaner and humidifier, a portable casing, having an air inlet opening in a side wall and an air outlet opening in its upper portion, a filter covering the inlet opening, a fan in said casing above said inlet opening, an electric motor for driving said fan, the lower portion of said casing below said filter comprising a water-containing vessel, a hollow rotary shaft connected with said motor to be rotated thereby, said shaft having an inlet opening adjacent said filter, the lower portion of said shaft beneath the water surface having a hollow radially directed arm in communication with the hollow of said shaft, and having an air outlet opening at a point radially spaced from said shaft, and a stationary vane extending inwardly from the casing adjacent said hollow arm.

6. In an air cleaner and humidifier, a portable casing, having an air inlet opening in a side wall and an air outlet opening in its upper portion, a filter covering the inlet opening, a fan in said casing above said inlet opening, an electric motor for driving said fan, the lower portion of said casing below said filter comprising a water-containing vessel, a hollow rotary shaft connected with said motor to be rotated thereby, said shaft having an inlet opening adjacent said filter, the lower portion of said shaft beneath the water surface having a hollow radially directed arm in communication with the hollow of said shaft, having an air outlet opening at a point radially spaced from said shaft, and a thrust bearing rotatably supporting the lower end of said shaft on the bottom of said casing.

7. In an air cleaner and humidifier, a portable casing, having an air inlet opening in a side wall and an air outlet opening in its upper portion, a filter covering the inlet opening, a fan in said casing above said inlet opening, an electric motor for driving said fan, the lower portion of said casing below said filter comprising a water-containing vessel, a hollow rotary shaft connected with said motor to be rotated thereby, said shaft having an inlet opening adjacent said filter, the lower portion of said shaft beneath the water surface having a hollow radially directed arm in communication with the hollow of said shaft, having an air outlet opening at a point radially spaced from said shaft, and an air scoop adjacent the air inlet of said shaft for forcing filtered air into and through said shaft.

CARL G. VRETMAN.